(12) United States Patent
Huang et al.

(10) Patent No.: US 9,369,082 B2
(45) Date of Patent: Jun. 14, 2016

(54) SOLAR POWER MOBILE CHARGING STATION

(71) Applicants: Haihui Huang, Cary, NC (US); Feng Ma, Cary, NC (US)

(72) Inventors: Haihui Huang, Cary, NC (US); Feng Ma, Cary, NC (US)

( * ) Notice: Subject to any disclaimer, the term of this patent is extended or adjusted under 35 U.S.C. 154(b) by 5 days.

(21) Appl. No.: 14/743,995

(22) Filed: Jun. 18, 2015

(65) Prior Publication Data
US 2015/0288317 A1 Oct. 8, 2015

Related U.S. Application Data

(63) Continuation-in-part of application No. 12/527,557, filed as application No. PCT/US2008/054172 on Feb. 15, 2008, now Pat. No. 9,070,809.

(60) Provisional application No. 60/890,159, filed on Feb. 15, 2007.

(51) Int. Cl.
*H02S 10/10* (2014.01)
*H02S 10/40* (2014.01)
*H02S 40/38* (2014.01)
*H02S 10/20* (2014.01)
*H02S 30/20* (2014.01)
*H02S 20/30* (2014.01)
*H02J 7/35* (2006.01)
*B60L 11/18* (2006.01)

(52) U.S. Cl.
CPC ............. *H02S 10/10* (2014.12); *B60L 11/1848* (2013.01); *H02J 7/355* (2013.01); *H02S 10/20* (2014.12); *H02S 10/40* (2014.12); *H02S 20/30* (2014.12); *H02S 30/20* (2014.12); *H02S 40/38* (2014.12); *Y02T 10/7005* (2013.01); *Y10T 307/367* (2015.04)

(58) Field of Classification Search
CPC ......... H02S 10/10; H02S 10/20; H02S 10/40; H02S 20/30; H02S 30/20; H02S 40/38; B60L 11/1848; H02J 7/355
See application file for complete search history.

(56) References Cited

U.S. PATENT DOCUMENTS

| | | | |
|---|---|---|---|
| 2006/0137348 A1* | 6/2006 | Pas | F03D 9/007 60/641.1 |
| 2006/0225778 A1* | 10/2006 | Brabec | B82Y 10/00 136/244 |
| 2007/0012349 A1* | 1/2007 | Gaudiana | G06Q 30/00 136/244 |
| 2008/0196758 A1* | 8/2008 | McGuire | F03D 9/007 136/245 |
| 2011/0221203 A1* | 9/2011 | Miller | F03D 9/007 290/55 |
| 2012/0060898 A1* | 3/2012 | Ahlgren | F24J 2/0477 136/248 |
| 2013/0132140 A1* | 5/2013 | Amin | G06Q 10/02 705/7.13 |

* cited by examiner

*Primary Examiner* — Matthew Martin
(74) *Attorney, Agent, or Firm* — Syncoda LLC; Feng Ma; Junjie Feng

(57) ABSTRACT

A mobile charging system includes a foldable solar panel and a battery configured to receive electricity generated by the solar panel and to charge one or more electric vehicles. The mobile charging system is configured to be towed or driven to locations to provide services to users. Users can park their electric vehicles under the shade of the solar panel, getting electricity either through the battery or directly from the solar panel, the hydro generator, or the wind turbine. The users can also get food from the kitchen, cooked from an electric stove or oven or microwave, cold drinks from the vending machine or refrigerator, and get online from the wireless router. Operators of the charging systems can broadcast their positions. Users can find the positions of the available systems using apps, and request services to be delivered at the user locations.

20 Claims, 10 Drawing Sheets

SOLAR POWER MOBILE CHARGING STATION

CROSS-REFERENCE TO RELATED APPLICATIONS

The present application is a continuation-in-part of U.S. patent application Ser. No. 12/527,557 (now U.S. Pat. No. 9,070,809) filed on Aug. 17, 2009, which is a U.S. national stage application under 35 U.S.C. §371 of PCT/US2008/054172 filed on Feb. 15, 2008, which claims priority to U.S. Provisional Application No. 60/890,159 filed on Feb. 15, 2007. The disclosures of these applications are incorporated herein by reference in their entirety.

BACKGROUND

Solar panels are used widely to generate electricity or to generate heat directly. Conventional solar panels are positioned facing the sun, as illustrated in FIG. 1. Referring to FIG. 1, a solar panel array 100 may include a plurality of solar panels 101a, 101b, . . . . The individual solar panels are usually positioned substantially in a same plane that substantially faces the sun 103. To maximize the efficiency of collecting solar energy, it is usually preferred that the solar panels are as vertical to the sun light direction 102 as possible. In some prior art, the solar panels are driven, using motors, to follow the sun. A significant portion of sun light is reflected back to the space, as shown by arrow 104. Anti-reflecting (AR) coatings have been used to lower the reflection.

SUMMARY

In an aspect, a mobile charging system is provided, including: a foldable solar panel; and a battery configured to receive electricity generated by the solar panel and to charge one or more electric vehicles; wherein the mobile charging system is configured to be towed or driven to locations to provide services to users.

A method for effectively collecting solar energy can be provided with the charging system, such as by including disposing solar panels substantially inter-facing each other, and reflecting sun light between inter-facing solar panels. Such improved solar energy collection efficiency can help the mobile charging system, which may be of limited size/space, to have improved power generation capability.

In another aspect, a method of providing clean energy is provided, including: unfolding a foldable solar panel; charging a battery with electricity generated by the solar panel; providing electricity to charge one or more electric vehicles from the battery; and towing or driving a mobile charging system comprising the foldable solar panel and the battery to a location to provide service to a user. In some embodiments, users/travelers can request the mobile charging systems to travel to the users' locations instead of going to the mobile charging stations. In some implementations, users can use apps to locate such mobile charging stations.

Various embodiments disclosed herein relate to a solar panel, including a first portion adapted to convert sun light into usable energy at a first optimal wavelength; and a second portion adapted to convert sun light into usable energy at a second optimal wavelength.

Some embodiments disclosed herein relate to a method for effectively collecting solar energy, including using a first portion of a first solar panel to partially convert a beam of sun light into usable energy, and partially reflect the beam of sun light into a second solar panel; and using the second solar panel to partially convert the reflected beam into collectable energy.

Other aspects and advantages of the claimed embodiments will become apparent from the following description and the attached claims.

DETAILED DESCRIPTION

Embodiments are described in detail below with respect to the drawings. Like reference numbers are used to denote like parts throughout for consistency.

In one aspect, some embodiments disclosed herein relate to methods and systems for effectively collecting solar energy using solar panels that allow sun light to be reflected between the panels.

Figure 1:
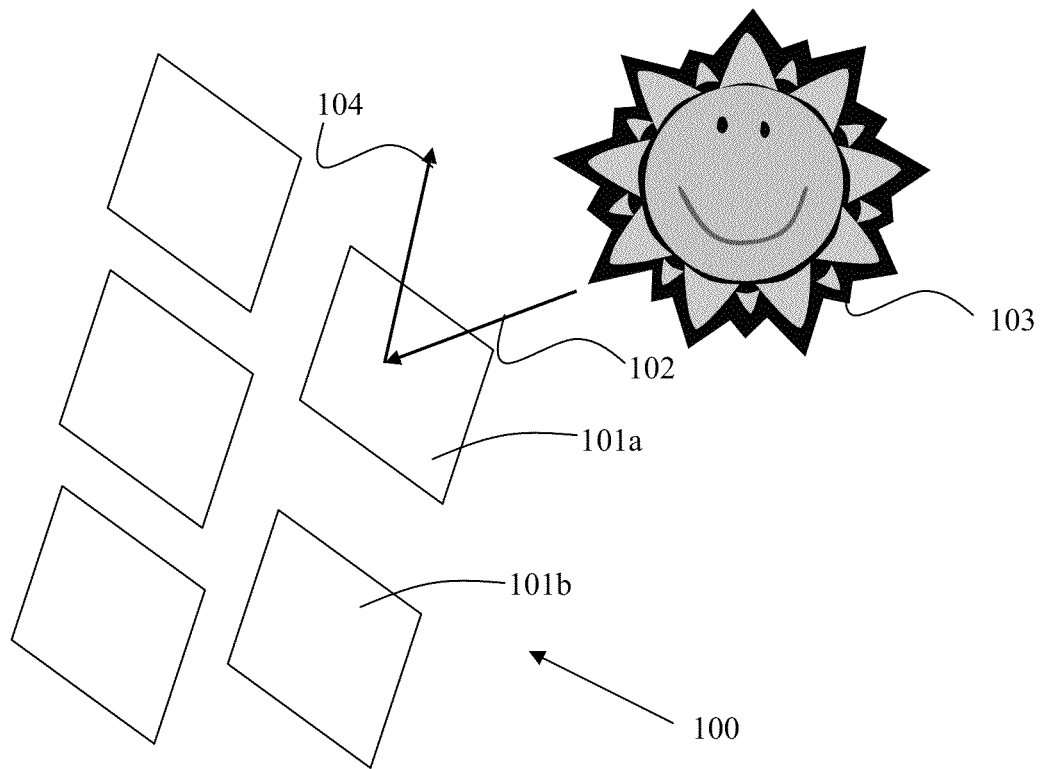
FIG. 1 illustrates a conventional solar panel array.
Figure 2:
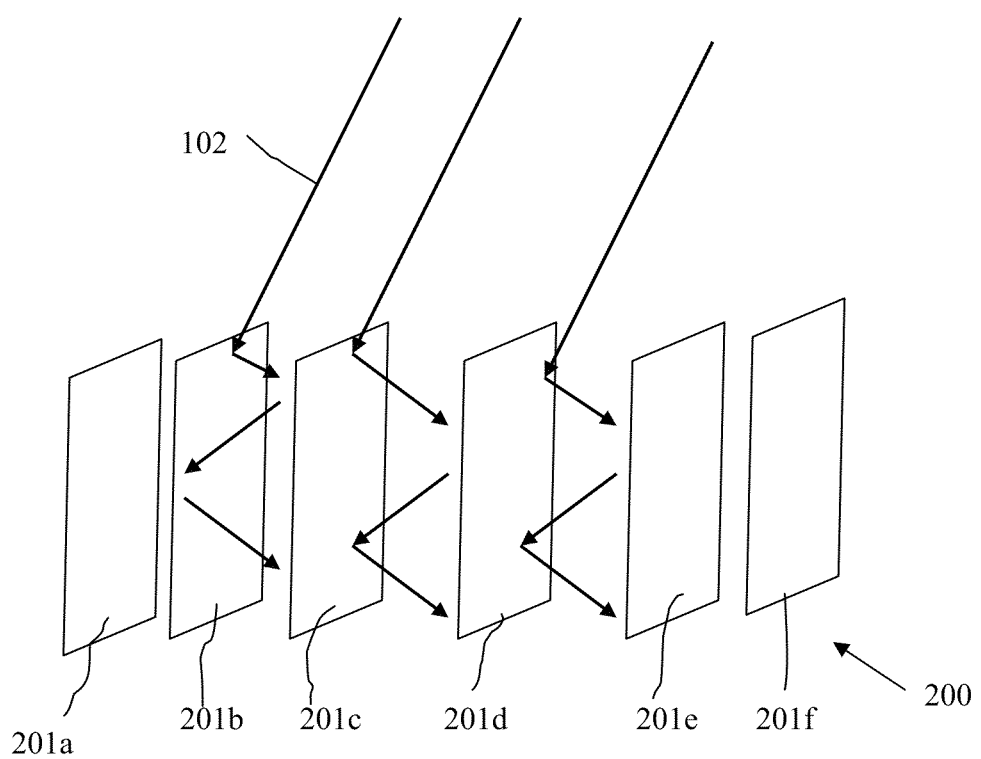
FIG. 2 illustrates a solar panel array according to some embodiments.

Referring to FIG. 2, a solar panel array 200 in accordance with an embodiment of the invention includes a plurality of solar panels 201a, 201b, . . . , 201f. A sunlight beam 102, for example, impinges on a solar panel 201b, and is partially absorbed and the energy is converted to, e.g., electricity, and is partially reflected to, e.g., another solar panel 201c. The light may be reflected back and forth many times, and is more efficiently collected. Unlike conventional solar panels, both sides of solar panels such as 201c in FIG. 2 are coated with active material, such as compound semiconductor based, or organic-material based, photovoltaic layers. AR coatings are not needed for these solar panels.

Although the solar panels in FIG. 2 are shown to be substantially parallel to each other, in accordance with some embodiments of the invention, the solar panels are not necessarily parallel to each other so long as they are substantially inter-facing such that sunlight reflected off one solar panel may be received by another solar panel.

Figure 3A:
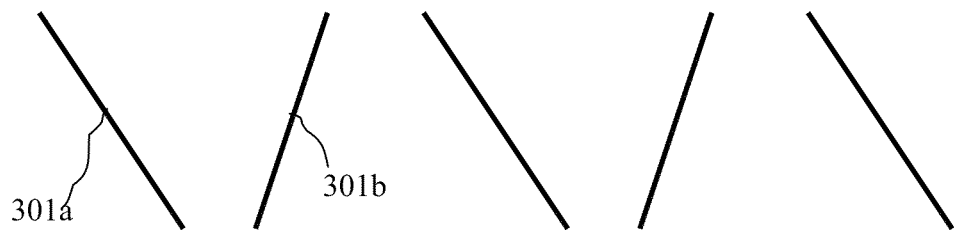
FIGS. 3A, 3B, and 3C illustrate various arrangements of solar panels according to some embodiments.

For example, shown in FIG. 3A, solar panels 301a, 301b, . . . , viewed from the side, have an angle therebetween. The angle between neighboring solar panels 301a and 301b are preferably less than 90° to allow a significant portion of sunlight being reflected off on a surface of a solar panel 301a to be received by, e.g., another solar panel 301b.

Figure 3B:
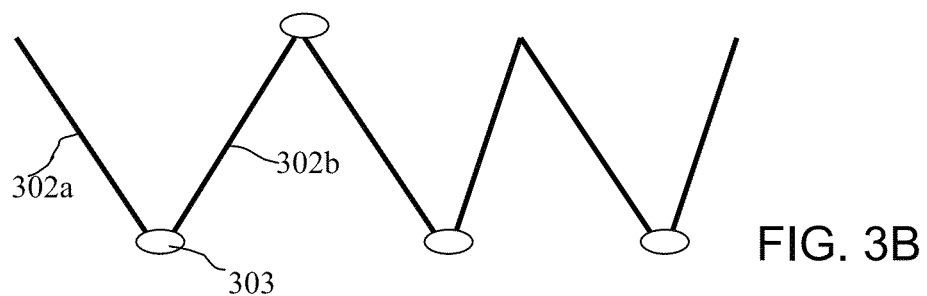

In accordance with some embodiments of the invention, shown in FIG. 3B, a plurality of solar panels 302a, 302b, ..., are joined by, e.g., a hinge, a connector, or any other means known in the art, such that the solar panels can be compressed when are not in use, and extended when in use. The solar panels may optionally be removed from the joints and become individual solar panels.

Figure 3C:
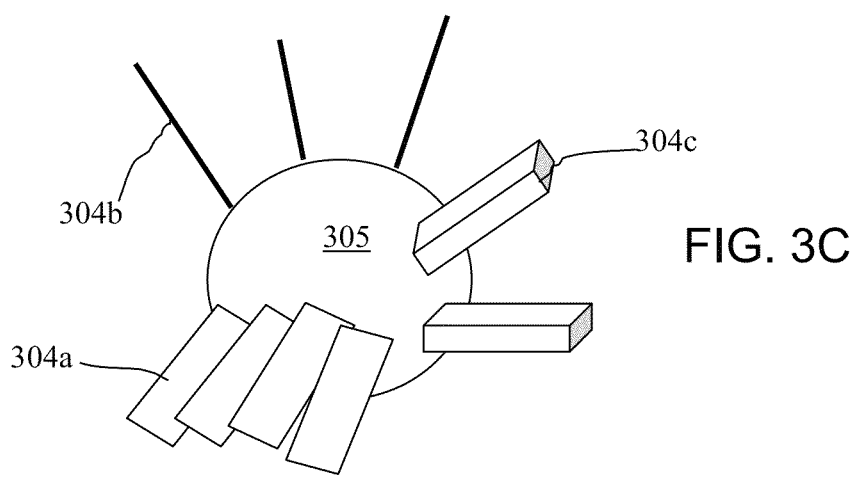

In accordance with some embodiments of the invention, shown in FIG. 3C, a plurality of solar panels 304a, 304b, ..., are disposed on a surface 305. The surface 305 may be spherical, cylindrical, or of any other shapes that allow an improved usage of space or areas. The solar "panels" are not necessarily two-dimensional plates having both sides coated with active layers. Rather, a solar "panel" such as 304c may have there-dimensional shapes with more than two surfaces coated with active layers.

Figure 4:
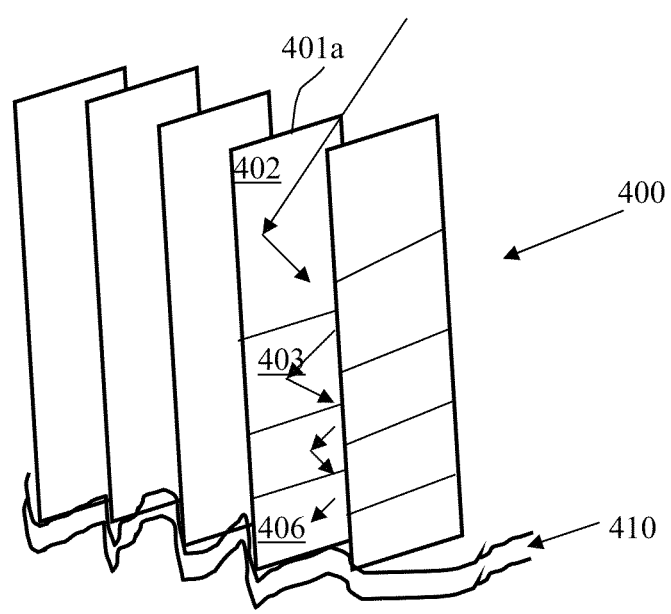
FIG. 4 illustrates a solar panel array including solar panels having different portions responding to different wavelengths in accordance with embodiments of the invention.

In accordance with some embodiments of the invention, shown in FIG. 4, a solar panel array 400 includes solar panels, e.g., 401a that has a plurality of portions 402, 403, ..., that are optimized for collecting solar energy at different wavelengths. For example, the first portion 402 may be optimized for converting UV light to electricity, and the second portion 403 may be optimized for converting sunlight at a longer wavelength to electricity, and other portions such as 406 is mainly responsible for converting infrared light or heat into usable energy.

When converting heat to usable energy, a portion 406 of the solar panel 401a may use the conventional method, such as heating a liquid or gas, and the heated liquid or gas can be used. In addition, the heat may be converted to electricity, e.g., through the Seebeck effect.

In accordance with some embodiments of the invention, the solar panel array 400 in FIG. 4 may be combined with a pipe or duct or tube 410, in which a cooling agent, such as water, flows. Not only the cooling agent cools the solar panels to improve the solar energy collection efficiency, the heat collected by the cooling agent may also be used, for example, to heat household water.

Figure 5:
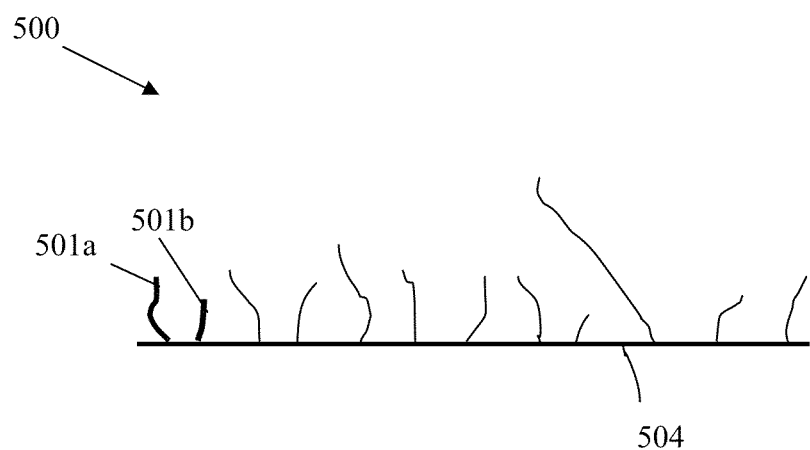
FIG. 5 illustrates a system configured to collect solar energy, including a plurality of irregular-shaped solar panels according to some embodiments.

In accordance with some embodiments of the invention, a solar panel array 500, shown in FIG. 5, include a plurality of irregular-shaped solar "panels" 501a, 501b, .... These "panels" may be grown on, e.g., a building top surface 504. The shapes of these "panels" may be grown in a self-organized fashion, taking advantage of low-cost material growth technology, while maximizing reception surface area and taking advantage of reflected sunlight.

In accordance with some embodiments of the invention, the reflection surfaces are made of porous structures to increase the area of the solar-power collecting surface and to take advantages of reflected sunlight.

Figure 6:
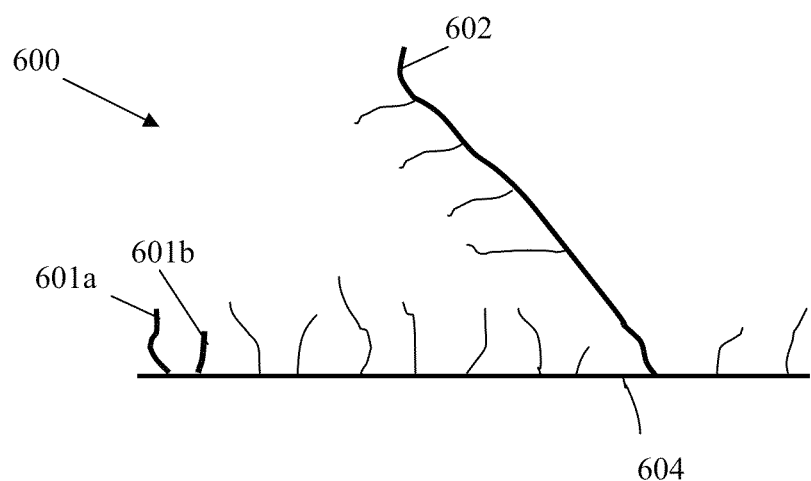
FIG. 6 illustrates a system including a plurality of irregular-shaped solar panels and a "master" panel according to some embodiments.

In accordance with some embodiments of the invention, shown in FIG. 6, the system 600 includes a "master" panel 602, which together with a surface 604 are primarily responsible for reflecting light back and forth to allow smaller panels 601a, 601b, ... to absorb the light. In accordance with some embodiments of the invention, the "master" panel 602 itself may have active layers to absorb sunlight. In accordance with some other embodiments of the invention, the "master" panel 602 only serves as a reflective surface. A plurality of smaller "panels" with active solar-energy converting layers may additionally be grown on the master panel 602.

Similar to the system of FIG. 4, cooling water may be circulated near or underneath the surfaces 602 and 604.

The solar panels discussed above are not limited to solar cells for converting sunlight to electricity. Solar panels that collect heat using circulating fluid or gas in, e.g., tubes on the panels can also take advantage of various embodiments of the present disclosure.

Advantages of one or more embodiments disclosed herein may include, but are not limited to improved collection efficiency; minimized space; no need for AR coating. Solar panels in accordance with embodiments of the invention may be installed, e.g., on building surfaces, ships, automobiles, balloons, or on spacecrafts.

Figure 7:
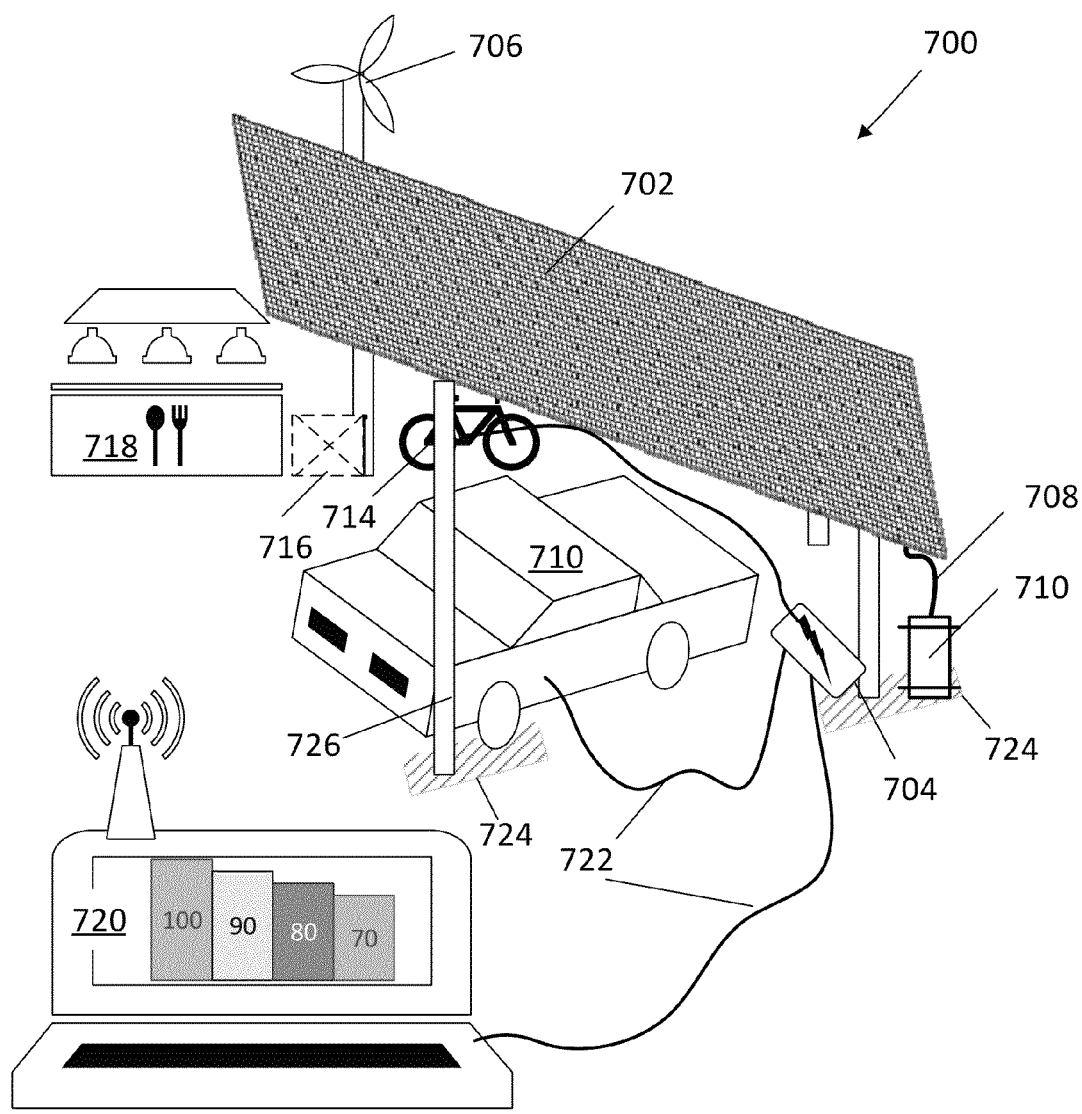
FIG. 7 illustrates a mobile charging station according to some embodiments.

One or more embodiments illustrated in FIGS. 1-6 can be applied to a charging station 700 illustrated in FIG. 7 according to some embodiments. Charging station 700 can include a solar panel 702. Solar panel 702 can be a convention panel illustrated in FIG. 1, or any other types of solar panels such as those illustrated in FIGS. 2-6. According to some embodiments, solar panel 702 can be used to charge rechargeable battery 704. Rechargeable battery 704 can be a lithium polymer battery, lead-acid battery, or any other types of energy storage devices. For example, the energy storage device can be an off-the-shelf apparatus such as Tesla's PowerWall™.

According to some embodiments, the charging station 700 can also include a wind turbine 706 configured to charge the battery 704 when there is wind, to supplement the solar panel 702 or when there is not sufficient sunlight. Solar panel 702 may also be configured to collect rain water when it rains. The water flowing down the solar panel 702 may go through a pipe 708, and be collected by a reservoir such as a rain barrel 710. A generator or alternator (not shown) can be driven by the flowing rain water to also generate electricity to charge the battery 704.

According to some embodiments, an electric water pump may be included (or alternatively the generator or alternator can act as a water pump) to pump water from the reservoir 710 to flow toward the solar panel 702 through pipes such as water pipe 410 illustrated in FIG. 4, to cool the solar panel 702 during hot days to thereby improve the solar power generation efficiency. The water pipes 410 can also be dual use and configured to collect rain water and let the water flow to the main pipe 708 during rainy days. That is, water flow in both directions can be configured.

According to some embodiments, battery 704 can be configured to charge various electric vehicles, such as electric car 712, electric bicycle or motorcycle 714, and power/charge a number of appliances such as cooling fans, wireless routers, and computers (not shown), vending machine and/or refrigerator 716, and kitchen 718. As such, charging station 700 can be placed near roads for travelers to use, such as parking their electric vehicles 710, 714 under the shade of the solar panel 702, being charged either through the battery 704 or directly from the solar panel 702, the hydro generator, or wind turbine 706 using electric cables 722. The travelers can also get food from the kitchen 718, cooked from an electric stove or oven or microwave, cold drinks from the vending machine or refrigerator 716, and get online from the wireless router for example using 3G, 4G, or satellite signals. An entertainment center can also be included in the mobile charging station 700 to provide users with movies, videos, games, music, etc.

A control console 720 can be included in the charging station 700. The control console 720 can be a computer, a tablet, a smart phone, or a physical consol with control switches. The console 720 can be used to monitor the charging operations, control the operations of the battery 704, the hydro generator, the pump, etc. The control console 720 can also bill the customers based on the electricity they consume or for other services they receive at the charging station 700.

According to some embodiments, one or more support structures 724, such as brackets or floors, can be included in the charging station 700. The support structures 724 can be coupled to the beams 726, and can have weight such as users' vehicles 710, 714, vendors' vehicles 802, 804, 806 (see, FIG. 8), battery 704, and/or water reservoir 710 disposed thereon to increase the stability of the charging station 700 particularly the elevated solar panel 702.

In some embodiments, the wind turbine and the solar panels can be folded/unfolded independently. In some other embodiments, they can be folded/unfolded together. The folding can be automatic, such as by pressing a button; in some embodiments, some assembling may be needed.

The mechanical folding/packing mechanism can take advantages of existing mechanical mechanisms.

In some implementations, the solar panels employ more affordable photovoltaic materials, such as organic materials, to allow more panels/photovoltaic cells disposed in a limited space, such as in the configuration illustrated in FIG. 4. As such, the photovoltaic cells do not necessarily employ the highest conversion efficiency materials, such as polysilicon, but rather can take advantage of the back-and-forth reflections between solar panels to improve the efficiency yet to contain the cost for materials. In some implementations, organic semiconducting materials are employed. Optimal material selection may be achieved by taking into account of both the limited space for deploying the solar panels and the cost of the materials. Organic materials may be particularly advantages according to some embodiments disclosed herein because they also can be made flexible, thereby facilitating the folding/unfolding process.

In some implementations, the control console 720, such as a smart phone of the owner or operator of the mobile charging station 700, can disseminate its location information, for example, through a wireless network, GPS or other satellite-based location methods, such as to the Internet. Using some satellite-based navigational systems such as BeiDou Navigation Satellite System allows two-way messaging or position reporting. The location can be based on the location of the smart phone of the operator (vendor), which provides an approximate location of the charging station 700, or use a location device as part of the mobile charging station 700.

A computer-implemented software-based system, such as App on a smart phone (e.g., iPhone™ or Android-based phone), can be configured to allow many users (e.g., electrical vehicle drivers) to locate nearest mobile charging stations 700. Locations of these mobile charging stations 700 can be displayed on a map of the user's smart phone.

In some implementations, users' software or App is configured to allow the users to request or "call" one or more mobile stations to come to the users' assistance by clicking on select or nearest mobile charging station locations. Vendors with mobile charging stations 700 can respond to and compete for the stranded users' requests. Billing can be automatically realized using a central billing system or using an electronic wallet function of the smart phones, based on the electricity and/or services purchased.

According to some embodiments, the complete charging station 700 or some elements of it can be configured as a mobile station. For example, the solar panel 702 can be foldable, such as using configurations illustrated in FIGS. 2-6. Together with the wind turbine 706 and the water reservoir 710, etc., the charging station 700 can be packed into a container (not shown). The container can be towed by, or a part of, a vehicle. The vehicle itself can be electricity powered, such as by drawing electricity from the battery 704 or through its own electricity.

An individual vendor can tow or drive the charging station 700 to near roads, to provide services of charging, parking, eating, getting online, etc. During evening or off-duty days, the vendor can bring the charging station back home, and use the charging station as a backup or even primary power supply for the home. Governments and charity organizations can purchase these mobile charging stations 700 and lease them to rural residents for them to use the clean energy as well as expanding a network charging stations along rural roads or highways.

It may be noted that the elements in FIG. 7 are not necessarily drawn to scale. In addition, the elements/system can be scaled up or down.

Figure 8A:
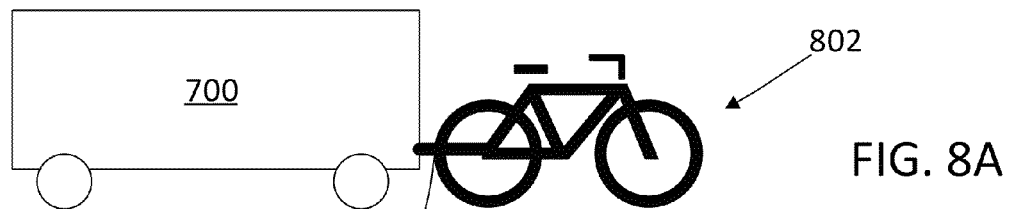
FIGS. 8A, 8B, and 8C illustrate various mobile charging stations in various folded or packed configurations according to some embodiments.
Figure 8B:
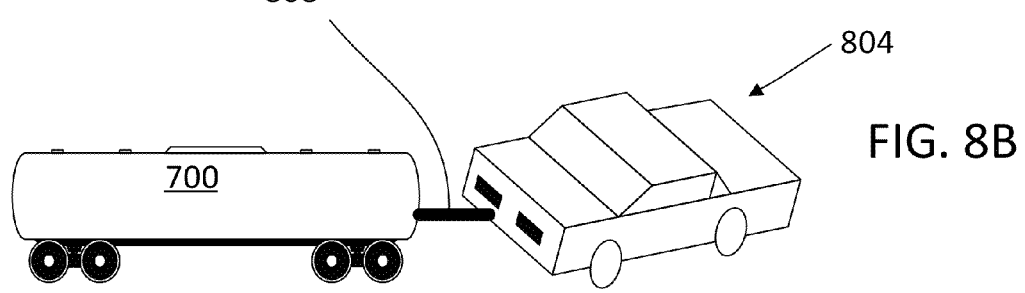
Figure 8C:
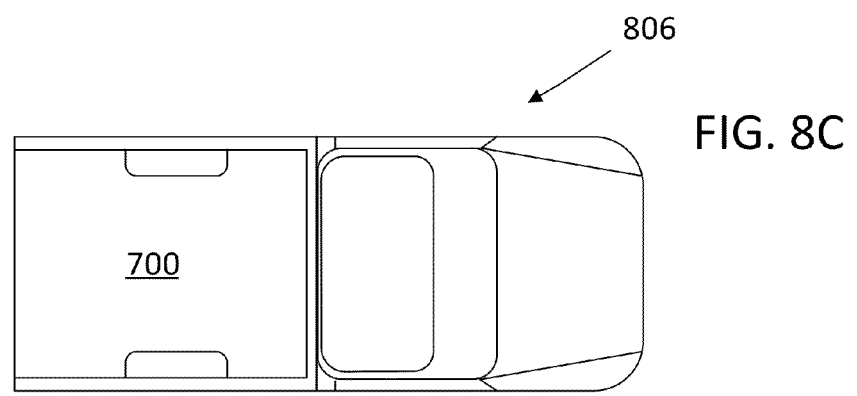

FIGS. 8A-8C illustrate some examples of the charging station 700 in its folded state according to some embodiments. For example, charging station 700 can be towed by an bicycle or tricycle 802, as illustrated in FIG. 8A; towed by a car 804, as illustrated in FIG. 8B. According to some implementations, a towing mechanism 808 may also include electric wiring to allow the vehicles 802, 804 (in the cases that themselves being electric vehicles such as electric bike or electric car) being powered/charged by the charging station 700.

In some other embodiments, the mobile charging station 700 can be self driven, such as being part of a pickup truck or recreational vehicle 806 as illustrated in FIG. 8C.

Figure 9A:
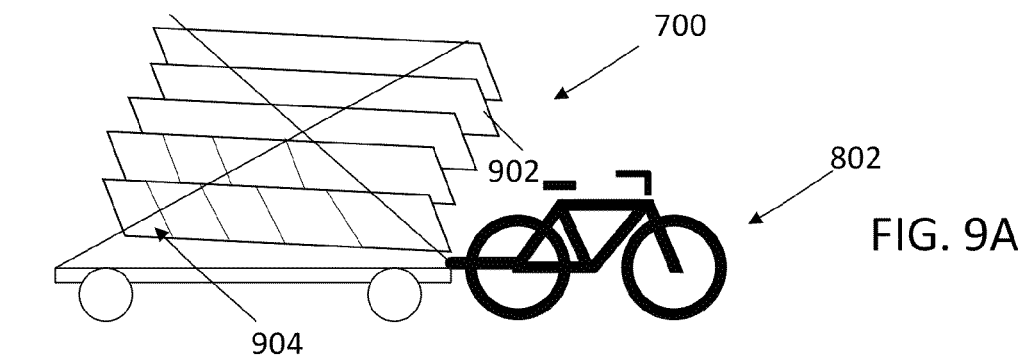
FIGS. 9A, 9B, and 9C illustrate various mobile charging stations in unfolded or extended configurations according to some embodiments.
Figure 9B:
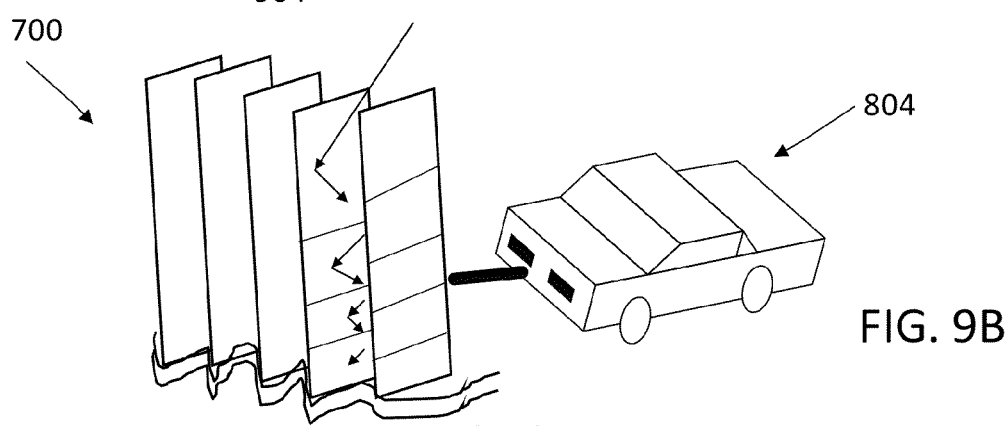
Figure 9C:
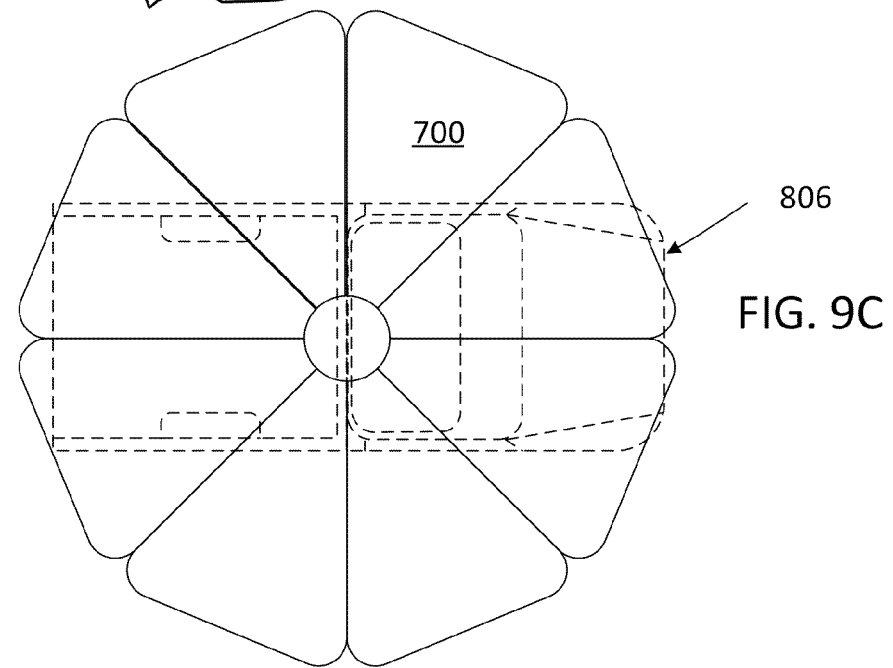

FIGS. 9A-9C illustrate some examples of the mobile charging station 700 being unfolded according to some embodiments. For example, FIG. 9A illustrates a configuration where multiple solar panels 902 are unfolded, using a hinge mechanism 904 or other mechanical structures known in the art. The solar panels 902 can be configured to have their slanted angles or the distances therebetween such that optimal sun light reception can be reached. For example, the misalignment and/or distance between the solar panels 902 can be increased such that there is reduced or no shading caused by one panel on another.

According to some implementations, the solar panels can be configured to weathervane to thereby reduce the impact of wind on the mobile charging station 700.

In some implementations, the solar panels 902 are configured to provide increased shading area to the parking space thereunder.

FIG. 9B illustrates a configuration where the multiple solar panels are substantially vertical after unfolding, similar to the embodiments illustrated in FIG. 4, to take advantage of back-and-forth reflection of sunlight between solar panels.

FIG. 9C illustrates a configuration where the solar panels of the mobile charging station 700 can be unfolded like an umbrella, to increase the area of solar reception as well as the shading area for the vehicle(s) parked thereunder.

According to some implementations, the mobile charging station 700 can further comprise a transformer/inverter to provide higher voltages for fast charging to electric vehicles. For example, it is possible to charge an electric vehicle in minutes.

According to some implementations, multiple charging stations 700 can be coupled together, such as by cascading, electrically connected in series or parallel, to increase electricity output. In an example, a stranded driver of a electric vehicle can request, using the driver's app, a plurality of vendors to bring multiple charging stations 700 to assist the driver for faster charging and/or larger capacity.

In some implementations, the apps or software can be based on social media, to help expand a network of charging stations, to request or call mobile charging stations and service centers to travel to the drivers, instead of the drivers driving to the stations as in the case of conventional gas stations and service centers.

Figure 10:
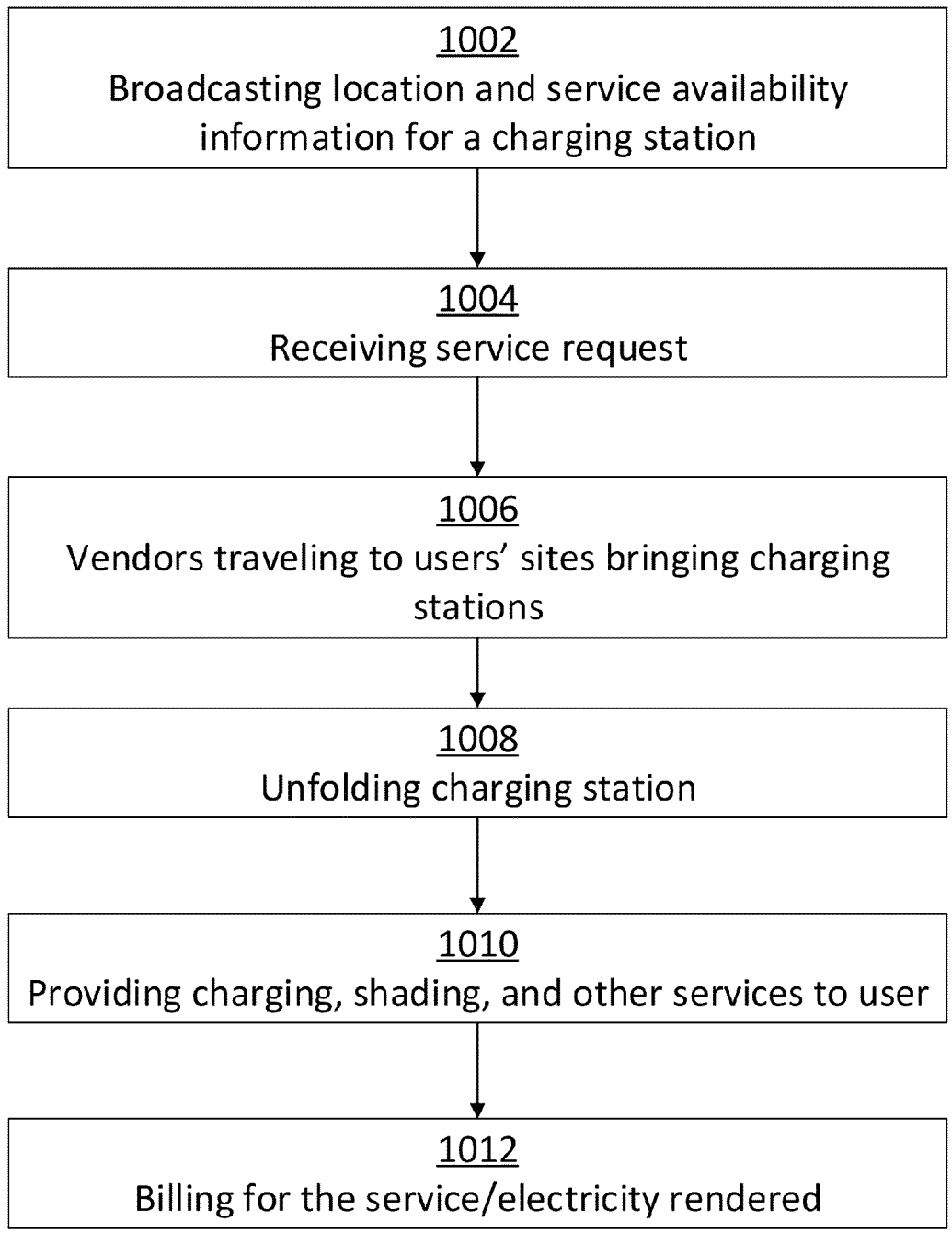
FIG. 10 is a flowchart of a method of deploying a mobile charging system according to some embodiments.

A method 1000 of deploying the services is illustrated in FIG. 10, wherein in a step 1002, vendors can broadcast their locations and service availabilities for their charging stations. In a step 1004, a vendor can receive service requests. In a step 1006, one or more vendors can drive the mobile charging station to the site of service needed, such as adjacent to roads and highways. In a step 1008, the charging station can be unfolded to collect more solar, wind or rain water energy if needed. In a step 1010, the vendor can provide electricity and/or other services to the users. In a step 1012, billing can be realized using a smart phone, a tablet computer, or through other methods known in the art.

All references referred to in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A mobile charging system, comprising:
   a foldable solar panel including:
   a plurality of elements each configured to convert solar energy into electricity or collectable energy;
   a master panel and a reflective surface configured to reflect sun light back and forth to allow the plurality of elements to absorb the reflected sun light;
   wherein at least two adjacent elements among the plurality of elements each are configured to partially reflect sun light to each other for partial absorption and conversion to electricity or collectable energy;
   wherein the plurality of elements include a porous structure configured to increase a solar energy collecting surface area, and a plurality of active solar energy converting layers having irregular three-dimensional shapes; and
   a battery configured to receive electricity generated by the solar panel and to charge one or more electric vehicles;
   wherein the mobile charging system is configured to be towed or driven to locations to provide electricity to users.

2. The system of claim 1, further comprising a wind turbine configured to generate electricity, wherein the plurality of elements are disposed over the reflective surface.

3. The mobile charging system of claim 2, further comprising:
   a hydro generator configured to generate electricity from rain water; and
   a reservoir for collecting the rain water;
   wherein the at least two elements each have a reflection surface and an energy collection surface.

4. The system of claim 3, further comprising:
   a refrigerator and a stove configured to be powered by the battery;
   wherein the reflection surface of one of the at least two elements comprises the porous structure.

5. The system of claim 1, wherein the solar panel comprises a plurality of smaller solar panels, and wherein at least a pair of neighboring smaller solar panels among the plurality of smaller solar panels are facing each other such that when a beam of sun light impinges on one of the pair of neighboring smaller solar panels, a reflected beam impinges on another one of the pair of neighboring smaller solar panels.

6. The system of claim 5,
   wherein a relative angle between the pair of neighboring solar panels is between −90 degrees and 90 degrees;
   wherein the master panel has a plurality of smaller elements disposed thereon.

7. The system of claim 6, wherein the relative angle is adjustable, wherein the smaller elements include the plurality of active solar energy converting layers.

8. The system of claim 7, wherein at least a subset of the plurality of solar panels are removably coupled together and the subset of the plurality of solar panels are foldable and extendable, wherein the plurality of smaller solar panels are disposed vertical to the reflective surface.

9. The system of claim 5,
   wherein at least a subset of the plurality of smaller solar panels are disposed on a cylindrical surface, and
   wherein the subset of the plurality of smaller solar panels each has a side substantially along a radial direction of the cylindrical surface.

10. The system of claim 5,
    wherein at least a subset of the plurality of smaller solar panels are disposed on a spherical surface,
    and wherein the subset of the plurality of smaller solar panels each has a side substantially along a radial direction of the spherical surface.

11. The system of claim 5, wherein each of the plurality of smaller solar panels comprises at least one of heat collecting element, a photovoltaic solar cell, or a photoconductive solar cell.

12. The system of the claim 5, wherein at least one of the plurality of solar panels comprises a plurality of portions, and wherein each of the plurality of portions corresponds to a specified wavelength of sun light.

13. The system of claim 5, further comprising a cooling unit configured to lower a temperature of the solar panel.

14. The system of claim 13, wherein the cooling unit is configured to collect thermal energy from at least a subset of the plurality of smaller solar panels.

15. The system of claim 14, wherein the cooling unit comprises circulating cooling agent for cooling the solar panel and for collecting the thermal energy.

16. A method of providing clean energy, comprising:
    unfolding a foldable solar panel;
    charging a battery with electricity generated by the foldable solar panel;
    providing electricity to charge one or more electric vehicles from the battery; and
    towing or driving a mobile charging system comprising the foldable solar panel and the battery to a location to provide electricity to a user;
    wherein the foldable solar panel includes:
    a plurality of elements each configured to convert solar energy into electricity or collectable energy; and
    a master panel and a reflective surface configured to reflect sun light back and forth to allow the plurality of elements to absorb the reflected sun light;
    wherein at least two adjacent elements among the plurality of elements each are configured to partially reflect sun light to each other for partial absorption and conversion to electricity or collectable energy; and
    wherein the plurality of elements include a porous structure configured to increase a solar energy collecting surface area, and a plurality of active solar energy converting layers having irregular three-dimensional shapes.

17. The method of claim 16, further comprising:
generating electricity with a wind turbine to also charge the battery; and
circulating cooling water at the solar panel using an electric pump to cool the solar panel and thereby improve solar power generation efficiency.

18. The method of claim 17, further comprising:
providing a position of the mobile charging system through Internet;
receiving a request for electricity through the Internet based on the location of the user and the position of the mobile charging system;
calculating a cost to the users based on electricity received by the users.

19. The method of claim 18, further comprising:
generating electricity from rain water using a hydro generator; and
collecting and reusing the rain water in a reservoir.

20. The method of claim 16, further comprising:
using a first portion of a first smaller solar panel to partially convert a beam of sun light into usable energy, and partially reflect the beam of sun light into a second smaller solar panel;
using the second smaller solar panel to partially convert the reflected beam into collectable energy;
using the second smaller solar panel to partially reflect the reflected beam to a second portion of the first smaller solar panel; and
using the second portion of the first smaller solar panel to further partially convert the twice-reflected beam into usable energy,
wherein the second portion and the first portion are configured to convert sun light into usable energy at different wavelengths.

\* \* \* \* \*